United States Patent
Oh et al.

(10) Patent No.: US 8,369,033 B2
(45) Date of Patent: Feb. 5, 2013

(54) METHOD OF MANUFACTURING LENS AND LENS MANUFACTURED USING THE SAME

(75) Inventors: Hye Ran Oh, Gyunggi-do (KR); Kwang Chun Lee, Gyunggi-do (KR); In Cheol Chang, Gyunggi-do (KR); Young Su Jin, Gyunggi-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 125 days.

(21) Appl. No.: 13/064,661

(22) Filed: Apr. 6, 2011

(65) Prior Publication Data

US 2012/0176688 A1   Jul. 12, 2012

(30) Foreign Application Priority Data

Jan. 12, 2011   (KR) .......................... 10-2011-0003219

(51) Int. Cl.
*G02B 9/00* (2006.01)
*G02B 3/08* (2006.01)
*B29D 11/00* (2006.01)

(52) U.S. Cl. ............................ 359/796; 359/740; 264/1.7
(58) Field of Classification Search ................... 264/1.1, 264/1.7, 102, 135; 359/738, 739, 740, 741, 359/796
See application file for complete search history.

(56) References Cited

U.S. PATENT DOCUMENTS

| | | | |
|---|---|---|---|
| 5,204,160 A * | 4/1993 | Rouser | 428/167 |
| 5,453,876 A * | 9/1995 | Hamada | 359/625 |
| 2012/0177819 A1 * | 7/2012 | Lee et al. | 427/164 |

FOREIGN PATENT DOCUMENTS

| | | |
|---|---|---|
| JP | 07-174902 | 7/1995 |
| JP | 10-186105 | 7/1998 |

* cited by examiner

*Primary Examiner* — David N Spector

(57) ABSTRACT

There is provided a method of manufacturing a lens, including applying a second lens material to a first lens member made of a first lens material; aligning and fixing a light shielding member to the second lens material; and further applying the second lens material to the first lens member and performing curing thereon to complete a second lens member.

13 Claims, 3 Drawing Sheets

METHOD OF MANUFACTURING LENS AND LENS MANUFACTURED USING THE SAME

CROSS-REFERENCE TO RELATED APPLICATIONS

This application claims the priority of Korean Patent Application No. 10-2011-0003219 filed on Jan. 12, 2011, in the Korean Intellectual Property Office, the disclosure of which is incorporated herein by reference.

BACKGROUND OF THE INVENTION

1. Field of the Invention

The present invention relates to a method of manufacturing a lens, and more particularly, to a method of manufacturing a lens capable of easily installing and forming a light shielding member therein, and a lens manufactured using the same.

2. Description of the Related Art

A small lens or a small lens module has a light shielding member. The light shielding member allows for the imaging of effective light alone, among light reflected from a subject on an image sensor or an image module.

When the center of the light shielding member does not coincide with an optical axis of the lens, the effective light may not be transmitted to a lens surface as it is. This has an effect on the shape of the subject imaged on the image sensor, which is considered to be a very important factor in image formation.

Meanwhile, the light shielding member is formed together with the lens during a process of stacking lenses, or is fixed to one surface of the lens by using of an adhesive.

However, in using the former method, it is hard to fix the position of the light shielding member and thus, it is hard to install the light shielding member accurately. On the other hand, it is easy to fix the position of the light shielding member in using the latter method; however, the refractive index or the shape of the lens surface may easily be deformed by adhesive onflowing on the lens surface.

A method of manufacturing a lens capable of accurately fixing and installing a light shielding member between lenses or in a lens is therefore urgently needed.

SUMMARY OF THE INVENTION

An aspect of the present invention provides a method of manufacturing a lens capable of accurately fixing and installing a light shielding member between lenses or in a lens and a lens manufactured using the same.

According to an aspect of the present invention, there is provided a method of manufacturing a lens, the method including: applying a second lens material to a first lens member made of a first lens material; aligning and fixing a light shielding member to the second lens material; and further applying the second lens material to the first lens member and performing curing thereon to complete a second lens member.

The first lens material and the second lens material may be made of materials having different refractive indexes.

The first lens material and the second lens material may be made of the same material.

The light shielding member may be aligned by an alignment member.

The alignment member may be a porous member or tape.

The alignment member may be a porous member, and the alignment member may be connected to a vacuum device to adsorb the light shielding member.

According to an aspect of the present invention, there is provided a method of manufacturing a lens, the method including: applying a lens material for forming a second lens member on one surface of a light shielding member; aligning and fixing the light shielding member to a first lens member; and further applying the lens material to the first lens member and performing curing thereon to form a second lens member.

The first lens material and the second lens material may be made of materials having different refractive indexes.

The first lens material and the second lens material may be made of the same material.

The light shielding member may be aligned by an alignment member.

The alignment member may be a porous member or tape.

The alignment member may be a porous member, and the alignment member maybe connected to a vacuum device to adsorb the light shielding member.

According to another aspect of the present invention, a lens manufactured by the method of manufacturing a lens of the exemplary embodiment of the present invention is provided.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Hereinafter, exemplary embodiments will be described in detail with reference to the accompanying drawings so that they can be easily practiced by those skilled in the art to which the present invention pertains. However, in describing the exemplary embodiments of the present invention, detailed descriptions of well-known functions or constructions are omitted so as not to obscure the description of the present invention with unnecessary detail.

Figure 1:
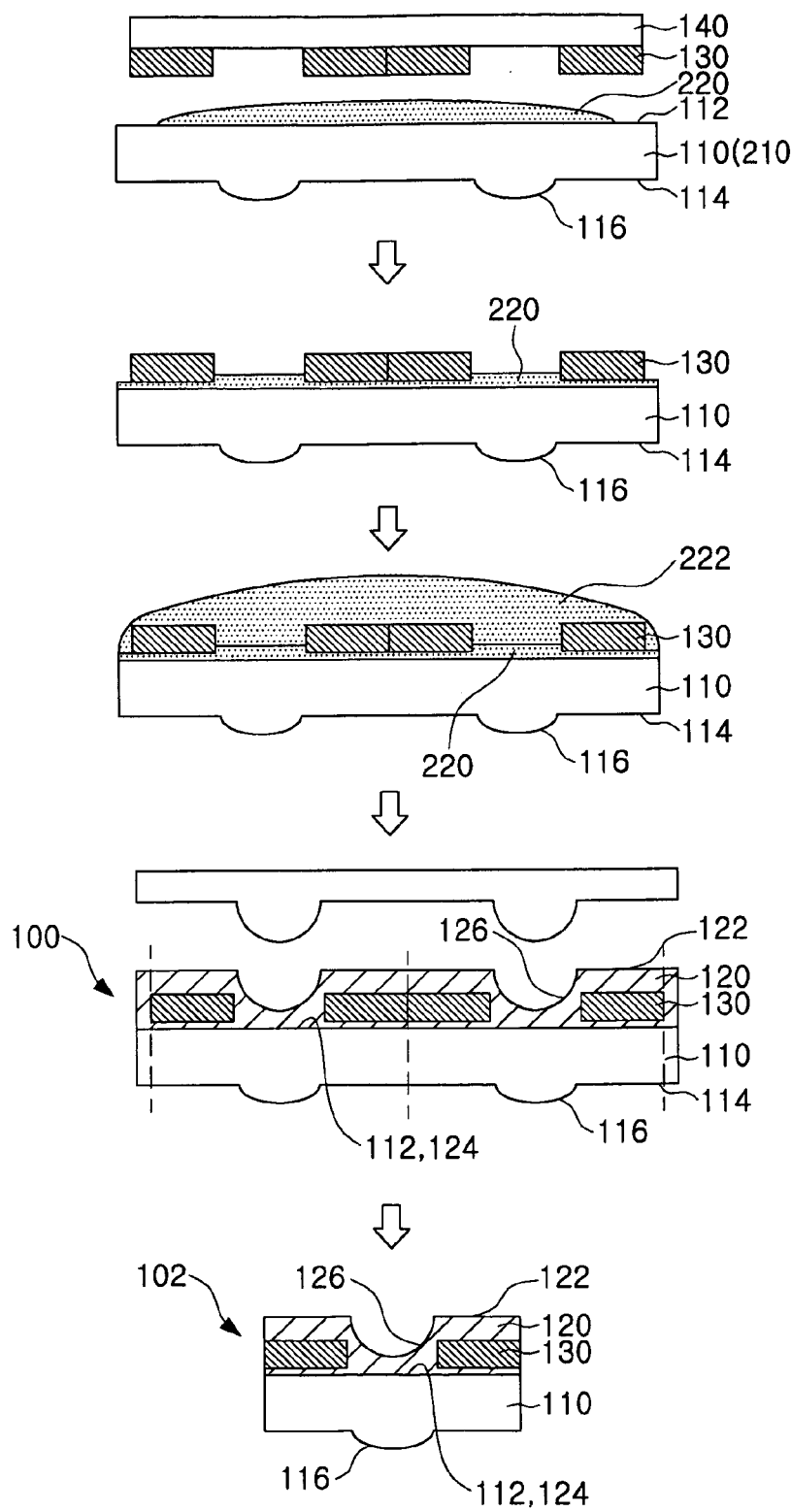
FIG. 1 is a diagram showing a method of manufacturing a lens according to a first exemplary embodiment of the present invention.
Figure 2:
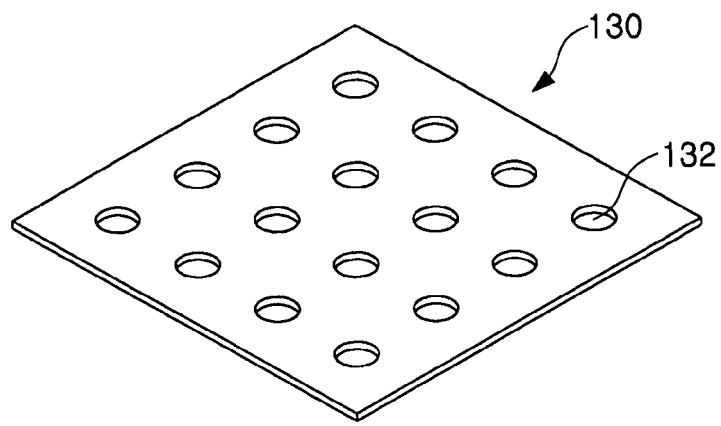
FIG. 2 is a perspective view showing a light shielding member shown in FIG. 1.
Figure 3:
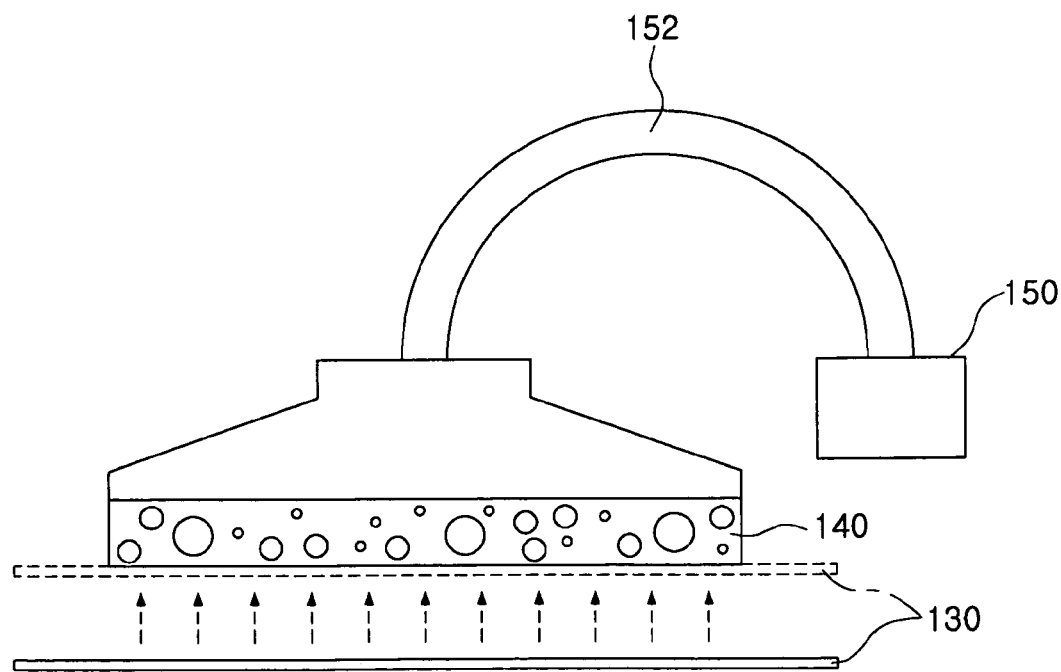
FIG. 3 is a diagram showing an example of an alignment member shown in FIG. 1.

A method of manufacturing a lens according to a first exemplary embodiment of the present invention will be described with reference to FIGS. 1, 2, and 3. FIG. 1 is a diagram showing a method of manufacturing a lens according to a first exemplary embodiment of the present invention, FIG. 2 is a perspective view showing a light shielding member shown in FIG. 1, and FIG. 3 is a diagram showing an example of an alignment member shown in FIG. 1.

The method of manufacturing a lens according to the first exemplary embodiment of the present invention is configured to include forming of a first lens member 110, attaching of a light shielding member 130, fixing of the light shielding member 130, and forming of a second lens member 120.

The attaching and fixing of the light shielding member 130 may easily be achieved through the use of the method of manufacturing a lens as described above, as compared to the related art, and the installation precision of the light shielding member 130 may be increased.

Next, the method of manufacturing a lens according to the first exemplary embodiment of the present invention will be described in sequence.

1) Forming Of First Lens Member 110

The first lens member 110 is made of a first lens material 210. In detail, the first lens member 110 is manufactured by molding the first lens material 210 through the use of a stamp or a mold. In this case, the first lens material 210 may be a material having a first refractive index and may be a material cured by heat or light (in particular, ultraviolet rays).

The first lens member 110 may have a first lens surface 116 on at least one of a first surface 112 and a second surface 114 according to the shape of the stamp or the mold. In the exemplary embodiment, the first lens member 110 has a plurality of first lens surfaces 116 on the second surface 114. In this configuration, the shape of the first lens surface 116 may be spherical, aspherical, convex, or concave.

For reference, the first lens member 110 may be a substrate forming a base of a lens module.

2) Attaching of Light Shielding Member 130

When the forming of the first lens member 110 is completed, the light shielding member 130 is attached to the first lens member 110.

The light shielding member 130 is made of a material that does not transmit light. If necessary, the light shielding member 130 may be made of a material that diffuse-reflects light or absorbs light. For example, the light shielding member 130 may be an opaque thin film.

The light shielding member 130 has an aperture 132 having a size equal to or larger than that of the first lens surface 116 of the first lens member 110. In this configuration, when the first lens member 110 has a plurality of first lens surfaces 116, the light shielding member 130 may also have a plurality of apertures 132 as shown in FIG. 2. The formation interval of the aperture 132 may be the same as that of the first lens surface 116.

The light shielding member 130 formed as above is attached to the first lens member 110 by a second lens material 220.

That is, when the first lens member 110 is completed, the second lens material 220 is applied to one surface (the first surface 112 in the exemplary embodiment of the present invention) of the first lens member 100. In this case, the application of the second lens material 220 may be performed by a spray method, a squeezing method, a printing method, or the like. Further, the applied amount or applied thickness of the second lens material 220 may be provided to a degree such that the light shielding member 130 to be disposed on the first lens member 110 may not be easily moved. In this case, the second lens material 220 may be a material having a second refractive index and may be a material cured by heat or light (in particular, ultraviolet rays). Further, the second lens material 220 may be a material having the same refractive index as that of the first lens material (that is, the first refractive index may be the same as the second refractive index).

Meanwhile, when the viscosity of the second lens material 220 is low and unable to fix the light shielding member 130, the second lens material 220 may be cured until it reaches a predetermined level of viscosity.

When the second lens material 220 is applied to the first lens member 110, the light shielding member 130 is installed thereon. In this case, since the second lens material 220 has the predetermined viscosity, the position of the light shielding member 130 may be stably maintained.

Meanwhile, when the position of the aperture 132 of the light shielding member 130 is inappropriately disposed with respect to the first lens surface 116 or the optical axis of the first lens surface 116, the position of the light shielding member 130 may be adjusted. This may be achieved in the state in which the second lens material 220 has not been completely cured. Further, since the second lens material 220 forms the second lens member 120, it does not have an effect on the performance of a lens array 100 or a lens 102 even in the case in which the applied thickness of the second lens material 220 is not uniform while the position of the light shielding member 130 is transferred.

Therefore, according to the exemplary embodiment of the present invention, attaching of the light shielding member 130 and changing of the attachment position thereof may be very easily performed.

Meanwhile, the installation of the light shielding member 130 is carried out by using the alignment member 140. In this case, the alignment member 140 may be adhesive tape, a member made of a porous material, or the like.

When the alignment member 140 is a member made of a porous material, it may be connected to a vacuum device 150 as shown in FIG. 3. The vacuum device 150 allows vacuum pressure to be selectively generated in the alignment member 140. The alignment member 140 and the vacuum device 150 may be connected by a plurality of tubes 152.

In this case, the light shielding member 130 is attached to the alignment member 140 when vacuum pressure is generated in the alignment member 140 and is separated from the alignment member 140 when atmospheric pressure is generated in the alignment member 140.

3) Fixing of Light Shielding Member 130

When the attaching of the light shielding member 130 to the first lens member 110 is completed, fixing of the light shielding member 130 is performed such that the attachment position of the light shielding member 130 is not changed. The fixing of the light shielding member 130 may be achieved by completely curing the second lens material 220 applied to the first lens member 110.

That is, when the aperture 132 of the light shielding member 130 accurately coincides with the optical axis of the first lens surface 116, the second lens material 220 is cured by applying heat to the second lens material 220 or irradiating light thereto.

Then, the second lens material 220 is cured together with the light shielding member 130, such that the light shielding member 130 is firmly fixed to the first lens member 110.

However, when the second lens material 220 has a sufficient viscosity, the fixing of the light shielding member 130 maybe accomplished due to the stickiness of the second lens material 220. Therefore, in this case, it is not necessary to cure the second lens material 220 during the attaching and fixing of the light shield member 130.

4) Forming of Second Lens Member 120

When the fixing of the light shielding member 130 is completed, the second lens material 220 is further applied to the first lens member 110 or is further formed.

The further application of the second lens material 222 may be performed by a spray method, a squeezing method, a printing method, or the like, as described above. Alternatively, the further formation of the second lens material 222 may be performed by injecting the second lens material 222 between the first lens member 110 and the stamp or the mold in the state in which the first lens member 110 is installed on the stamp or the mold. Therefore, the second lens material 222 may have a spherical surface or aspherical surface or a lens surface 126 of a convex shape, or a concave shape according to the shape of the stamp or the mold.

Meanwhile, in the exemplary embodiment of the present invention, the second lens surface 126 is formed on the first surface 122 of the second lens member 120; however, the second lens surface 126 may be further formed on the second surface 124.

When the shapes of the second lens materials 220 and 222 are defined by the stamp or the mold, the second lens materials 220 and 222 may be cured by applying heat thereto or irradiating light thereto. Herein, the second lens material 220 is integrated with the second lens material 222 while being cured by heat or light, thereby not forming an interface surface with the second lens material 222.

When the curing of the second lens materials 220 and 222 is finished, the lens array 100 including the first lens member 110 and the second lens member 120 is completed. The lens array 100 is cut off into a predetermined unit, thereby completing a single lens 102.

The lens array 100 or the lens 102 formed by the above-mentioned process does not include foreign materials, such as an adhesive, between the first lens member 110 and the second lens member 120. Therefore, according to the exemplary embodiment of the present invention, it is possible to effectively reduce the performance degradation of the lens array 100 or the lens 102 due to the installation of the light shielding member 130.

Further, according to the exemplary embodiment of the present invention, fixing the light shielding member 130 may be easily performed and changing the position of the light shielding member 130 may be enabled. Therefore, the aperture 132 of the light shielding member 130 may be easily and accurately aligned on the optical axis of the lens surfaces 116 and 126.

Figure 4:
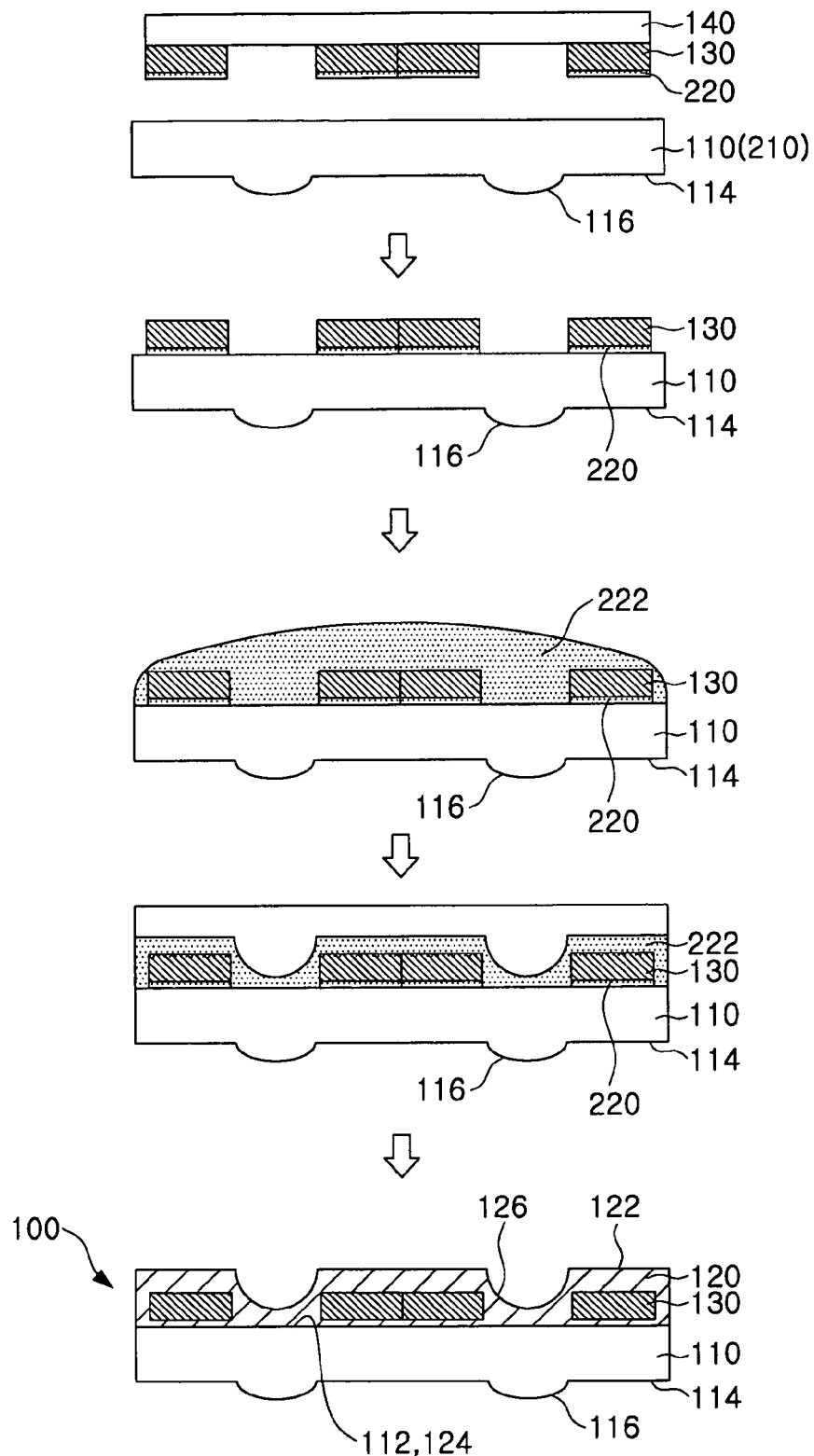
FIG. 4 is a diagram showing a method of manufacturing a lens according to a second exemplary embodiment of the present invention.

Next, a method of manufacturing a lens according to a second exemplary embodiment of the present invention will be described with reference to FIG. 4. FIG. 4 is a diagram showing a method of manufacturing a lens according to a second exemplary embodiment of the present invention. In the second exemplary embodiment, the same components as in the first exemplary embodiment of the present invention use the same reference numerals and the detailed description of these components will be omitted.

Similar to in the first exemplary embodiment of the present invention, the method of manufacturing a lens according to the second exemplary embodiment of the present invention is configured to include forming of the first lens member 110, attaching of the light shielding member 130, fixing of the light shielding member 130, and forming of the second lens member 120.

In this case, the second embodiment of the present invention has a difference from the first exemplary embodiment in the attaching of the light shielding member 130. Therefore, the fixing of the light shielding member 130 according to the second exemplary embodiment will be described below.

Unlike in the first exemplary embodiment, in the attaching of the light shielding member 130 according to the second exemplary embodiment of the present invention, the second lens material 220 is applied to the light shielding member 130. The application of the second lens material 220 may be performed by a spray method, a squeezing method, a printing method, or the like. In addition, the application of the second lens material 220 may be performed by a method of temporarily or instantly dipping the light shielding member 130 fixed to a jig 140 in a water tank in which the second lens material 220 is dipped.

As described above, the second lens material 220 is directly applied to the light shielding member 130, the second lens material 220 is used corresponding to an amount required to attach the light shielding member 130. Further, the second lens material 220 does not exist on the optical axis of the first lens surface 116.

This can minimize the generation of a portion of the interface surface that may be very rarely formed between the second lens material denoted by reference numeral 220 that is mostly initially cured, and the second lens material denoted by reference numeral 222 that is mostly cured later.

That is, according to the exemplary embodiment of the present invention, the second material 220 is not applied to the optical axis connecting the first lens surface 116 with the second lens surface 126, such that the lens performance of the second lens member 120 can be uniformly maintained.

As set forth above, in the exemplary embodiment of the present invention a light shielding member can be accurately installed between lenses or in a lens. Therefore, according to the exemplary embodiment of the present invention, the performance of the lens could be maintained as it is, even in a state in which the light shielding member is installed in the lens.

Further, according to the exemplary embodiment of the present invention, the light shielding member is fixed by using the lens material to thereby allows the fixing of the light shielding member to be facilitated. Therefore, the lens or the lens module having the light shielding member can rapidly and easily manufactured according to the exemplary embodiment of the present invention.

While the present invention has been shown and described in connection with the exemplary embodiments, it will be apparent to those skilled in the art that modification and variations can be made with out departing from the spirit and scope of the invention as defined by the appended claims.

What is claimed is:

1. A method of manufacturing a lens, comprising:
applying a second lens material to a first lens member made of a first lens material;
aligning and fixing a light shielding member to the second lens material; and
further applying the second lens material to the first lens member and performing curing thereon to complete a second lens member.

2. The method of claim 1, wherein the first lens material and the second lens material are made of materials having different refractive indexes.

3. The method of claim 1, wherein the first lens material and the second lens material are made of the same material.

4. The method of claim 1, wherein the light shielding member is aligned by an alignment member.

5. The method of claim 4, wherein the alignment member is a porous member or tape.

6. The method of claim 4, wherein the alignment member is a porous member, and
the alignment member is connected to a vacuum device to adsorb the light shielding member.

7. A lens manufactured by the method of manufacturing a lens of claim 1.

8. A method of manufacturing a lens, comprising:
applying a lens material for forming a second lens member on one surface of a light shielding member;
aligning and fixing the light shielding member to a first lens member; and
further applying the lens material to the first lens member and performing curing thereon to form a second lens member.

9. The method of claim 8, wherein the first lens material and the second lens material are made of materials having different refractive indexes.

10. The method of claim 8, wherein the first lens material and the second lens material are made of the same material.

11. The method of claim 8, wherein the light shielding member is aligned by an alignment member.

12. The method of claim 11, wherein the alignment member is a porous member or tape.

13. The method of claim 11, wherein the alignment member is a porous member, and
the alignment member is connected to a vacuum device to adsorb the light shielding member.

* * * * *